(12) United States Patent
Liu et al.

(10) Patent No.: US 9,939,571 B2
(45) Date of Patent: Apr. 10, 2018

(54) DISPLAY PANEL AND ITS MANUFACTURING METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Xiaomin Liu, Xiamen (CN); Long Zhang, Xiamen (CN); Ting Zhou, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 124 days.

(21) Appl. No.: 15/044,664

(22) Filed: Feb. 16, 2016

(65) Prior Publication Data
US 2016/0238892 A1 Aug. 18, 2016

(30) Foreign Application Priority Data

Feb. 13, 2015 (CN) .......................... 2015 1 0078514

(51) Int. Cl.
*G02B 5/30* (2006.01)
*G02B 5/20* (2006.01)
*G02F 1/1335* (2006.01)

(52) U.S. Cl.
CPC .......... *G02B 5/3058* (2013.01); *G02B 5/201* (2013.01); *G02B 5/305* (2013.01);
(Continued)

(58) Field of Classification Search
CPC . G02B 5/20; G02B 5/201; G02B 5/30; G02B 5/3025; G02B 5/3033;
(Continued)

(56) References Cited

U.S. PATENT DOCUMENTS 6,049,428 A * 4/2000 Khan ..................... C07C 309/44
359/487.02
8,952,599 B2 * 2/2015 Jung ..................... G02B 5/3083
313/112

(Continued)

FOREIGN PATENT DOCUMENTS

CN 1339715 A 3/2002
CN 1716055 A 1/2006
(Continued)

*Primary Examiner* — Stephone B Allen
*Assistant Examiner* — Adam W Booher
(74) *Attorney, Agent, or Firm* — Anova Law Group, PLLC

(57) ABSTRACT

A display panel includes a color filter film, a first polarizing film, and a second polarizing film. The color filter film comprises a color filter region and a light blocking region. The first polarizing film, placed at one side of the color filter film, comprises a first region corresponding to the color filter region of the color filter film and a second region corresponding to the light blocking region of the color filter film. The second polarizing film, placed at the one side of the color filter film, comprises a first region corresponding to the color filter region of the color filter film and a second region corresponding to the light blocking region of the color filter film, wherein a polarization axis of the second region of the second polarizing film and a polarization axis of the second region of the first polarizing film are perpendicular to each other.

19 Claims, 12 Drawing Sheets

(52) U.S. Cl.
CPC .. *G02F 1/133512* (2013.01); *G02F 1/133514* (2013.01); *G02F 1/133528* (2013.01); *G02F 2001/133531* (2013.01); *G02F 2001/133538* (2013.01)

(58) Field of Classification Search
CPC .... G02B 5/3041; G02B 5/305; G02B 5/3058; G02F 1/133509; G02F 1/133512; G02F 1/133514; G02F 1/133528; G02F 2001/133531; G02F 2001/133538
See application file for complete search history.

(56) References Cited

U.S. PATENT DOCUMENTS

| | | | | |
|---|---|---|---|---|
| 2001/0026335 | A1* | 10/2001 | Moon | G02F 1/133512 349/63 |
| 2002/0163616 | A1* | 11/2002 | Jones | G02B 5/3033 349/187 |
| 2004/0169795 | A1* | 9/2004 | Yeh | G02F 1/133528 349/106 |
| 2007/0082145 | A1* | 4/2007 | Han | G02B 5/201 428/1.1 |
| 2016/0238881 | A1* | 8/2016 | Chong | G02B 6/0011 |

FOREIGN PATENT DOCUMENTS

| | | | |
|---|---|---|---|
| CN | 1847927 | A | 10/2006 |
| CN | 101051143 | A | 10/2007 |
| CN | 101581852 | A | 11/2009 |
| CN | 103033940 | A | 4/2013 |
| CN | 103852896 | A | 6/2014 |
| CN | 104122703 | A | 10/2014 |
| KR | 20130037126 | A * | 4/2013 |

* cited by examiner

DISPLAY PANEL AND ITS MANUFACTURING METHOD THEREOF

CROSS-REFERENCES TO RELATED APPLICATIONS

This application claims priority of Chinese Patent Application No. 201510078514.3, filed on Feb. 13, 2015, the entire contents of which are hereby incorporated by reference.

FIELD OF THE INVENTION

The present disclosure generally relates to the field of display technologies and, more particularly, relates to a display panel, a display device, and manufacturing methods thereof.

BACKGROUND

Liquid crystal display (LCD) technology is currently one of the most widely used display technologies. An LCD panel typically comprises an upper substrate and a lower substrate. The upper substrate is called a color filtering substrate (CF substrate, or color filter), and the lower substrate is called a thin film transistor substrate (TFT substrate). In a conventional liquid crystal display device, the CF substrate and the TFT substrate are bonded through block stickers, and liquid crystal is filled between the CF substrate and the TFT substrate, forming an LCD panel.

Further, a polarizer is configured on each of the CF substrate and TFT substrate respectively. A polarizer may absorb the light in the direction of one polarization axis, while allow the light in direction of another polarization axis to pass through. By changing the voltage applied to the liquid crystal and thus changing the rotation angle of the liquid crystal molecules, the rotation direction and the polarization state of a polarized light may be controlled, and thus the amount of light passing through the polarizer can be controlled. By the joint operation of a polarizer and the CF substrate, images displayed on an LCD panel can be changed.

FIG. 1 illustrates an exploded structural view of a conventional display panel, and FIG. 2 illustrates a cross-sectional view of the conventional display panel. As shown in FIGS. 1 and 2, the display panel includes a transparent cover plate 101, a polarizer 103, and a color filter film 102. In the non-display region of the transparent cover plate 101, there is a light-blocking black matrix 104. In the non-pixel region of the color filter film 102, there is also a light-blocking black matrix 104.

In general, transparent cover plates and LCD modules containing color filter films are made by different manufacturers, and then assembled to form completed products of display panels. Because transparent cover plates and color filter films are made by different manufacturers, the material compositions of the black matrixes in the transparent cover plates and color filter films may be different. Therefore, the reflection rate of the black matrix at the non-display area of a transparent cover plate 101 and the reflection rate of the black matrix at the non-pixel region of the color filter film 102 of an LCD module may be different. The presence of the polarizer 103 further amplifies the reflection rate difference, resulting in red reflection lines and other issues.

The disclosed structures and their manufacturing methods are directed to solve one or more problems set forth above and other problems in the art.

BRIEF SUMMARY OF THE DISCLOSURE

One aspect of the present disclosure includes a display panel. The display panel includes a color filter film, a first polarizing film, and a second polarizing film. The color filter film comprises a color filter region and a light blocking region. The first polarizing film, placed at one side of the color filter film, comprises a first region corresponding to the color filter region of the color filter film and a second region corresponding to the light blocking region of the color filter film. The second polarizing film, placed at the one side of the color filter film, comprises a first region corresponding to the color filter region of the color filter film and a second region corresponding to the light blocking region of the color filter film, wherein a polarization axis of the second region of the second polarizing film and a polarization axis of the second region of the first polarizing film are perpendicular to each other.

Another aspect of the present disclosure includes a method for manufacturing a display panel. The method includes providing a color filter film comprising a color filter region and a light-blocking region; forming a first polarizing film on one side of the color filter film and having a first region corresponding to the color filter region, wherein the first polarizing film comprises a first organic film; and irradiating, with a polarized ultraviolet light, a region of the first organic film of the first polarizing film corresponding to the light blocking region of the color filter film to form a second region with a polarizing axis. Further, the method includes forming a second polarizing film on the first polarizing film and having a first region corresponding to the color filter region, wherein the second polarizing film comprises a second organic film; rotating the incomplete display panel by 90 degrees clockwise or counterclockwise; and irradiating, with the polarized ultraviolet light, a region of the second organic film of the second polarizing film corresponding to the light blocking region of the color filter film to form a second region with a polarizing axis.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
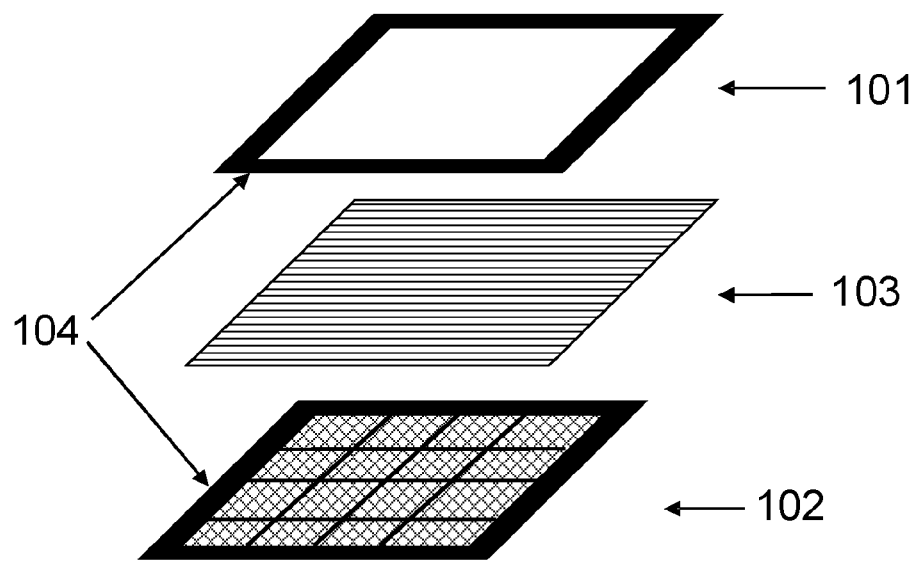
FIG. 1 illustrates an exploded structural view of a conventional display panel.
Figure 2:
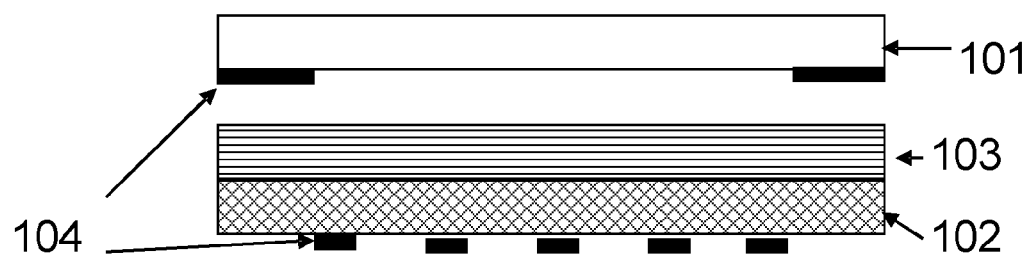
FIG. 2 illustrates a cross-sectional view of a conventional display panel.
Figure 3:
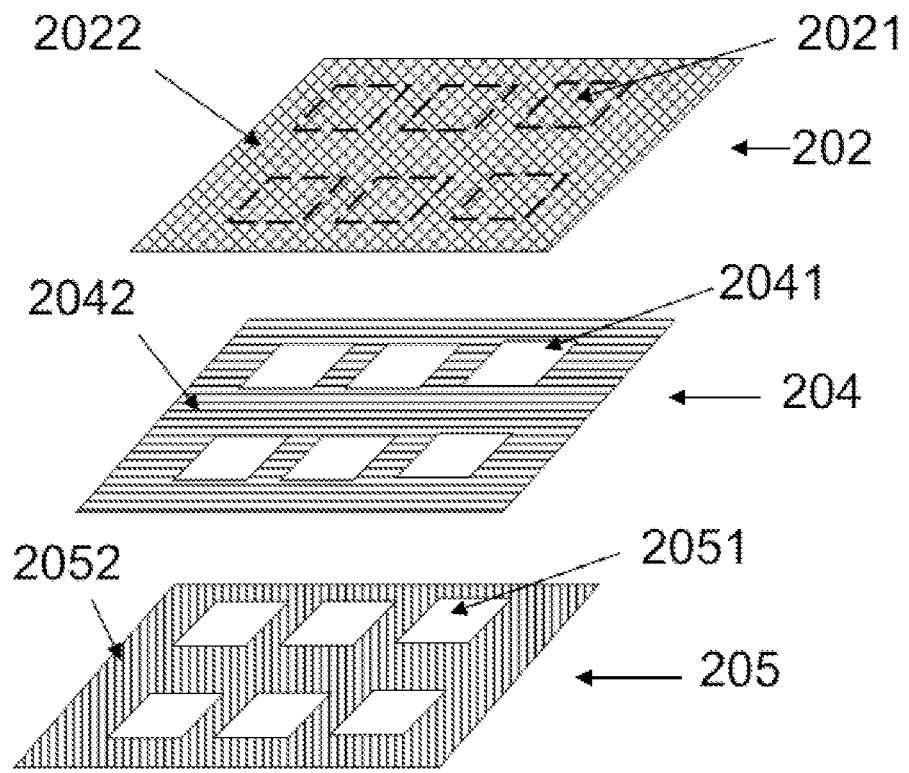
FIG. 3 illustrates an exploded structural view of an exemplary display panel consistent with the disclosed embodiments.
Figure 4:
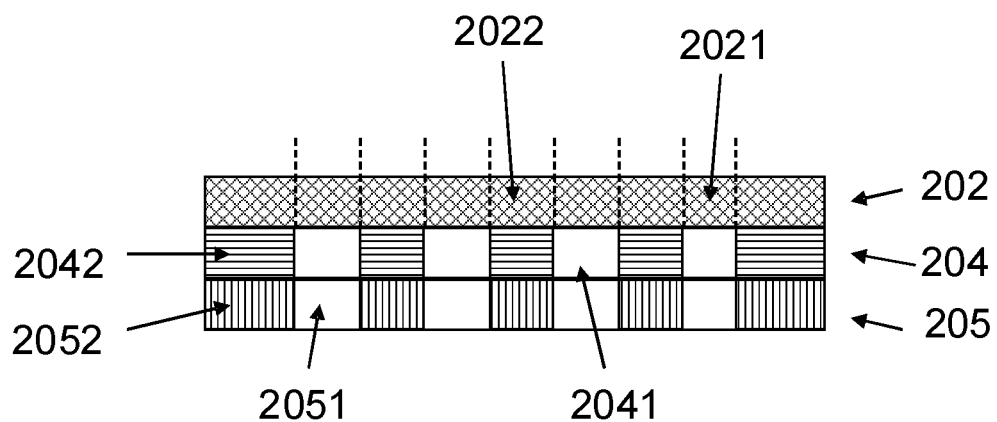
FIG. 4 illustrates a cross sectional view of an exemplary display panel consistent with the disclosed embodiments.

FIG. 3 illustrates an exploded structural view of an exemplary display panel, and FIG. 4 illustrates a cross sectional view of the exemplary display panel. As shown in FIG. 3 and FIG. 4, the display panel comprises a color filter film 202, a first polarizing film 204, and a second polarizing film 205. Other components may also be included.

The color filter film 202 is at one side of the first polarizing film 204, and the second polarizing film 205 is at the other side of the first polarizing film 204. The color filter film 202 comprises a color filter region 2021 and a light blocking region 2022. The first polarizing film 204 comprises a first region 2041 corresponding to the color filter region 2021 of the color filter film 202, and a second region 2042 corresponding to the light blocking region 2022 of the color filter film 202. The second polarizing film 205 comprises a first region 2051 corresponding to the color filter region 2021 of the color filter film 202, and a second region 2052 corresponding to the light blocking region 2022 of the color filter film 202. The polarization axis of the second region 2042 of the first polarizing film 204 and the polarization axis of the second region 2052 of the second polarizing film 205 are perpendicular to each other.

In operation, light is incident from the side of second polarizing film 205 toward the color filter film 202. After passing through the second region 2052 of the second polarizing film 205, the light becomes a linearly polarized light, and the polarization direction of the light is parallel to the polarization axis of the second polarizing film 205 (i.e., the polarization axis of the second region 2052 of the second polarizing film 205). After the linearly polarized light arrives at the second region 2042 of the first polarizing film 204, as the polarization axis of the second region 2042 of the first polarizing film 204 is perpendicular to the polarizing axis of the second region 2052 of the second polarizing film 205, the linearly polarized light is completely blocked. Therefore, no light arrives at the light blocking region 2022 of the color filter film 202, and thus no light comes out from the light blocking region 2022 of the color filter film 202.

Specifically, if the angle between the polarization axis of the second region of the first polarizing film 204 and the polarization axis of the second region of the second polarizing film 205 is a, the intensity of light coming out from the second region of the first polarizing film 204 is cos α of the intensity of the light entering into the second region of the first polarizing film 204. In the present exemplary embodiment, the angle between the polarization axis of the second region of the first polarizing film 204 and the polarizing axis of the second region of the second polarizing film 205 is 90°. Since cos 90° is equal to 0, no light comes out from the second region 2042 of the first polarizing film 204, and thus no light comes out from the light blocking region 2022 of the color filter film 202.

Thus, as the polarization axis of the second region of the first polarizing film and the polarization axis of the second region of the second polarizing film are perpendicular to each other, the second region of the display panel completely blocks the light incident from the second region of the second polarizing film. As the first region 2041 of the first polarizing film 204 and the first region 2051 of the second polarizing film 205 do not have polarization axes, light may completely propagate through the color filter region 2021 of the color filter film 202, displaying images. By using the disclosed structure, there is no need for using the black matrix, thus avoiding the problem of light leakage.

Further, the first polarizing film 204 comprises a first organic film, and the second polarizing film 205 comprises a second organic film. The first organic film and the second organic film have an aligning function under the irradiation of a polarized ultraviolet light.

The material of the organic films may be, for example, polyimide doped with a dichroic organic dye. The dichroic organic dye may possess the properties of: 1) high dichroism, 2) uniform dyeing characteristics, 3) excellent moisture heat resistance characteristics, and 4) no changes and sublimation phenomena when heated. Specifically, the dichroic dye may be an azo dye. Azo dyes, including bisazo and trisazo compounds, have excellent moisture heat resistance characteristics. The representative chemical structural formulas for azo dyes are the following structural formula (1) and structural formula (2).

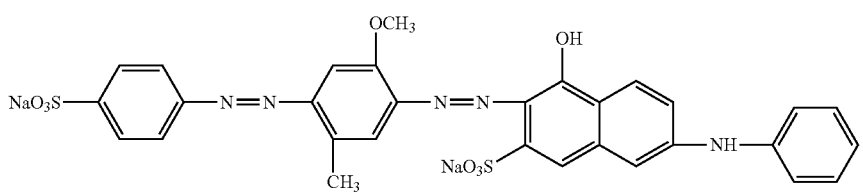

(1)

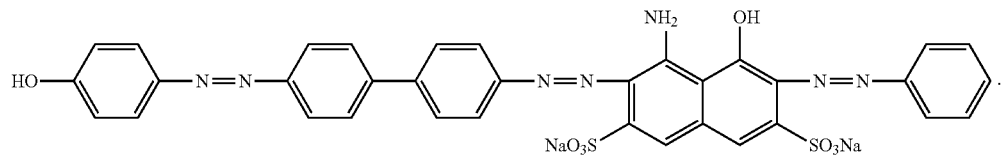
(2)

By introducing an appropriate electron donating group or electron withdrawing group at the end of an azo dye molecule, the mobility of the electrons at the large II bond of the azo dye molecule may be changed, and the absorption intensity and the absorption band may be increased, and thus the dyeing characteristics of the dichroic dye may be enhanced. The chemical structure of an azo dye molecule with an electron donating group or electron withdrawing group at its end may be illustrated by the following chemical structure formula:

a type of triphenylmethane diazinon and derivative dyes

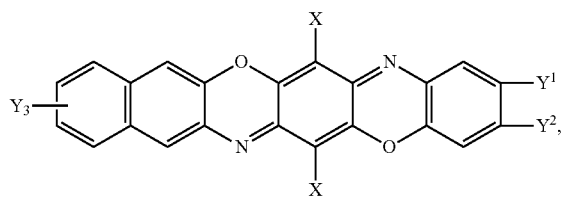

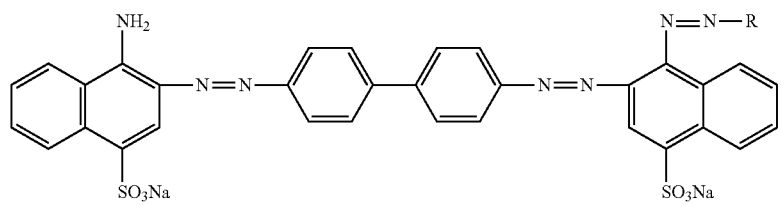

where R is a type of single-methine and multi-methine dyes

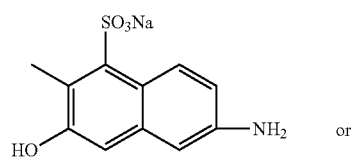

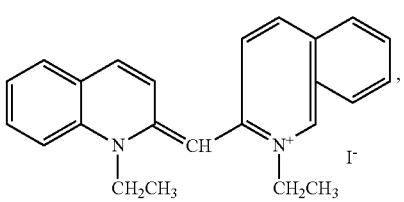

or

In addition, the dichroic dyes may also be a type of anthraquinone dyes

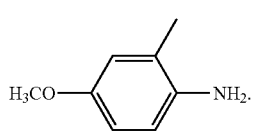

biphenyl dyes, or polyethylene ring type dyes. The above mentioned dyes may be doped in polyimide, so as to make the organic film have the aligning function under the irradiation of ultraviolet polarized light.

In addition, the display panel further comprises a first substrate and a second substrate that are oppositely placed (not shown in FIG. 3 and FIG. 4). The first polarizing film is formed on the first substrate, and the second polarizing film is formed on the second substrate. The color filter region of the color filter film is filled with red, blue or green color barriers. Both the first region of the first polarizing film and the first region of the second polarizing film correspond to the pixel region of the display panel.

Figure 5:
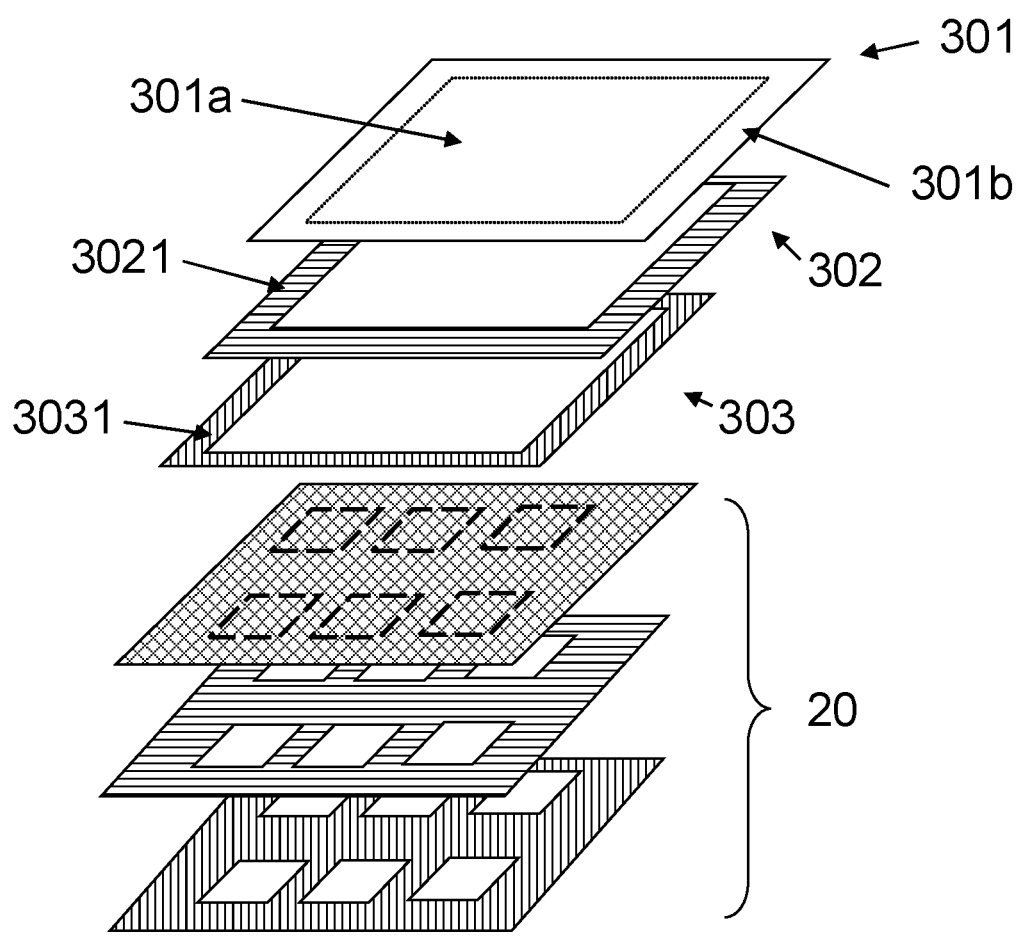
FIG. 5 illustrates an exploded structural view of another exemplary display panel consistent with the disclosed embodiments.
Figure 6:
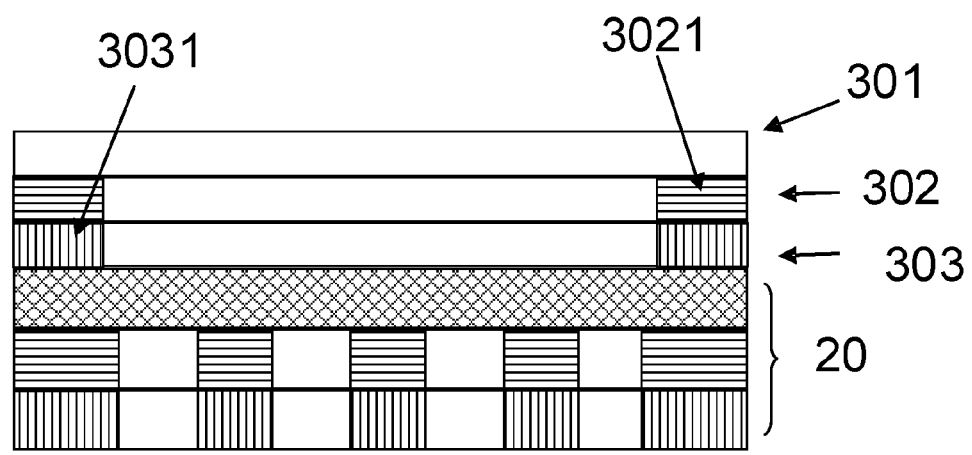
FIG. 6 illustrates a cross sectional view of another exemplary display panel consistent with the disclosed embodiments.

FIG. 5 illustrates an exploded structural view of another exemplary display panel, and FIG. 6 illustrates a cross-sectional view of the exemplary display panel. The display panel comprises a liquid crystal display module 20, a transparent cover plate 301, a third polarizing film 302, and a fourth polarizing film 303. The liquid crystal display module 20 comprises a color filter film, a first polarizing film, and a second polarization film. The structures and working principles of the liquid crystal display module 20 are described in above sections and are omitted here. The third polarizing film 302 and the fourth polarizing film 303

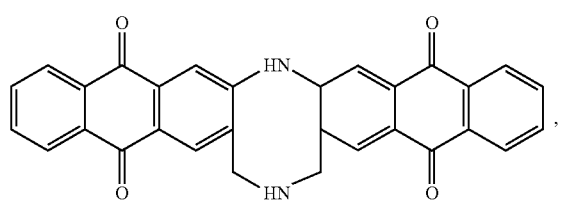 [SMILES: O=C1C2=CC3CNCc4cc5c(cc4NC3C=C2C(=O)c2ccccc21)C(=O)c1ccccc1C5=O]

are placed between the transparent cover plate 301 and the liquid crystal display module 20.

The transparent cover plate 301 comprises a display area 301a and a non-display area 301b. The third polarizing film 302 comprises a third region 3021 at the place corresponding to the non-display region 301b of the transparent cover plate 301. The fourth polarizing film 303 comprises a third region 3031 at the place corresponding to the non-display region 301b of the transparent cover 301. Each of the third region 3021 of the third polarizing film 302 and the third region 3031 of the fourth polarizing film 303 has a polarization axis, and the polarization axis of the third region 3021 and the polarization axis of the third region 3031 are perpendicular to each other.

In operation, light propagates along the direction from the crystal display module 20 toward the transparent cover plate 301. After passing through the third region 3031 of fourth polarizing film 303, the light becomes a linearly polarized light with its polarization axis parallel to the polarization axis of the third region 3031 of the fourth polarizing film 303. The light further goes into the third region 3021 of the third polarizing film 302. As the polarization axis of the third region 3021 of the third polarizing film 302 is perpendicular to the polarization axis of the third region 3031 of fourth polarizing film 303, the light is completely blocked. Therefore the light cannot goes into the non-display region 301b of the transparent cover plate 301.

Further, the third polarizing film 302 comprises a third organic film, and the fourth polarizing film comprises a fourth organic film. The third organic film and the fourth organic film may be aligned under the irradiation of polarized ultraviolet light. The third organic film and the fourth organic film may be made from polyimide (PI) doped with a dichroic organic dye.

Figure 12:
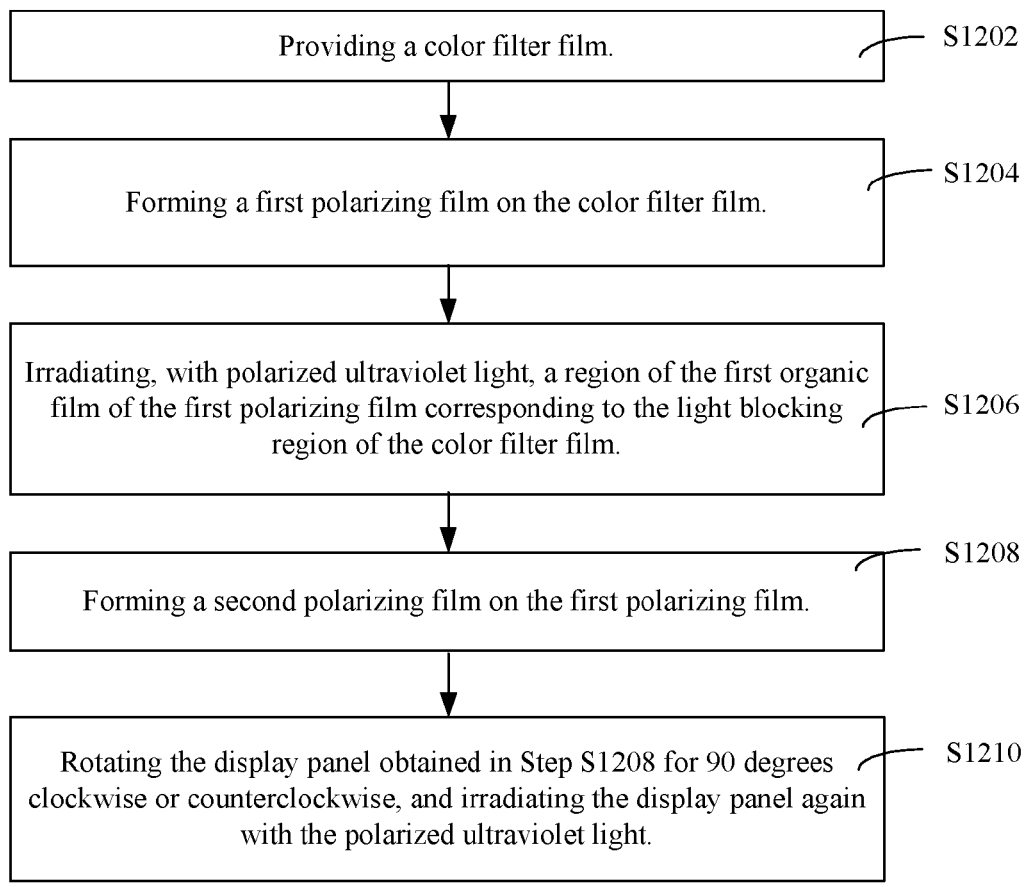
FIG. 12 illustrates an exemplary process flow chart consistent with the disclosed embodiments.

FIG. 12 illustrates an exemplary process for manufacturing a display panel. As shown in FIG. 12, the process for manufacturing a display panel includes following steps.

Figure 9A:
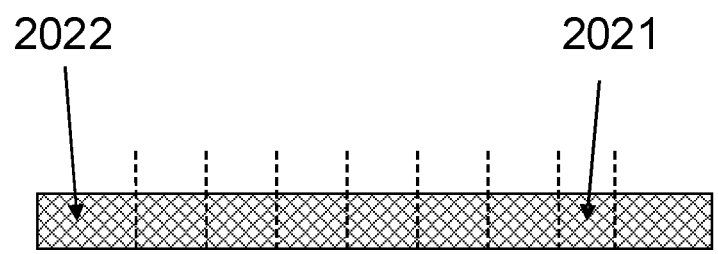
FIG. 9A, FIG. 9B and FIG. 9C illustrate a set of exemplary forming processes consistent with the disclosed embodiments.

Step S1202: providing a color filter film 202. FIG. 9A illustrates a corresponding structure. As shown in FIG. 9A, the color filter film 202 comprises a color filter region 2021 and a light-blocking region 2022. The color filter region 2021 corresponds to the pixel region of the display panel (not shown).

Figure 9B:
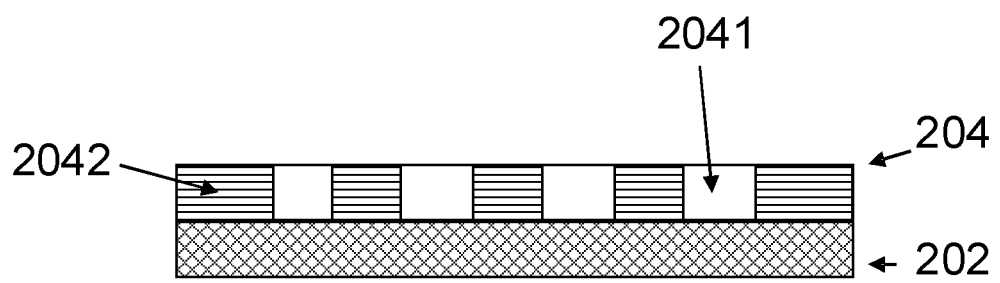

Step S1204: forming a first polarizing film 204 on the color filter film 202. FIG. 9B illustrates a corresponding structure. As shown in FIG. 9B, the first polarizing film 204 comprises a first organic film, and the material of the first organic film may be polyimide doped with a dichroic dye. More specifically, the color filter film 202 may be coated with a layer of polyimide prepolymer doped with a dichroic organic dye. The dichroic dye may be an azo dye, an anthraquinone dye, a biphenyl dye, a type of triphenylmethane diazinon and derivative dye, a type of single-methine multi-methine dye, or a poly-methine ring dye.

Step S1206: irradiating, with polarized ultraviolet light, a region of the first organic film of the first polarizing film 204 corresponding to the light blocking region 2022 of the color filter film 202, forming a second region 2042 with a polarizing axis.

Figure 7:
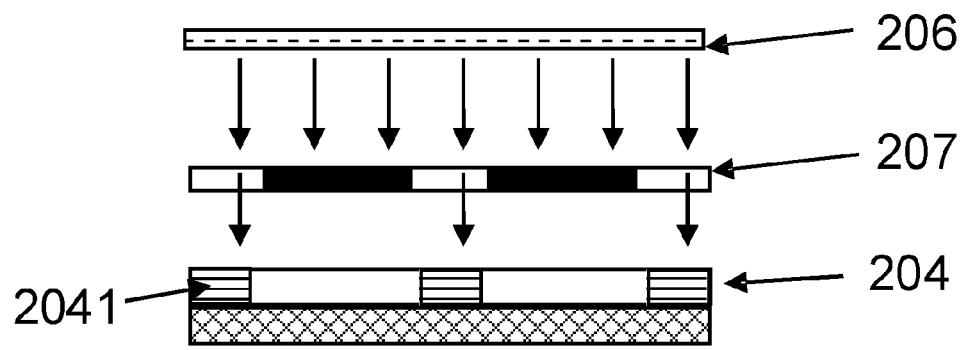
FIG. 7 illustrates an exemplary manufacturing process consistent with the disclosed embodiments.

FIG. 7 illustrates an exemplary configuration for the irradiation process of this step. The barrier mask 207 above the first polarizing film 204 is used to define the patterns of the first region 2041 and the second region 2042 of the polarizing film 204. The metal grating 206 above the barrier mask 207 acts as a polarizer, converting a non-polarized light into a linearly polarized light. In the irradiation procedure, light goes in the direction from the metal grating 206 toward the first polarizing film 204.

Figure 8A:
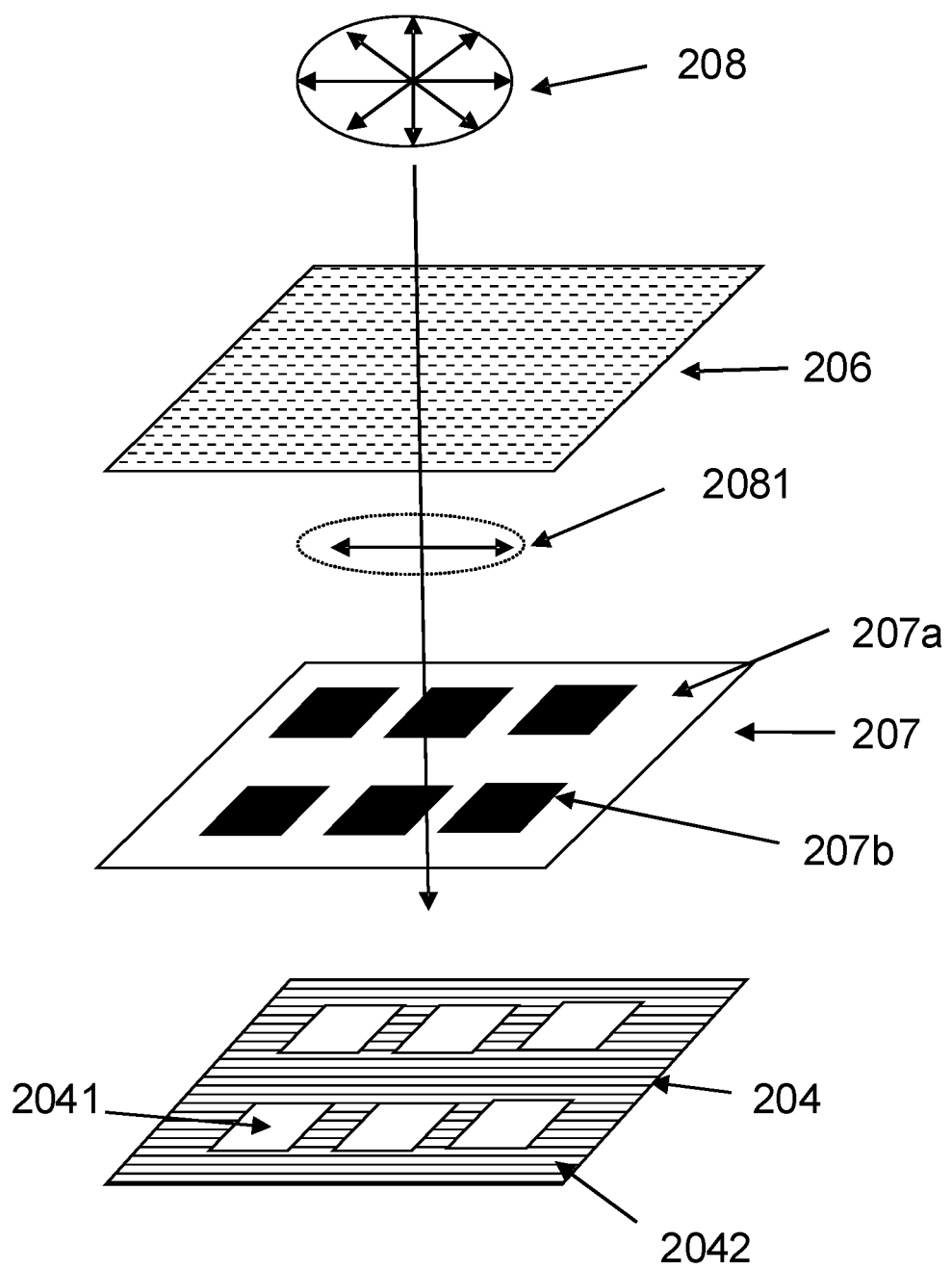
FIG. 8A and FIG. 8B illustrate a set of exemplary manufacturing steps consistent with the disclosed embodiments.

FIG. 8A illustrates the operation procedure of this step. After the ultraviolet light 208 passes through the metal grating 206, the ultraviolet light becomes a polarized ultraviolet light 2081. The polarized ultraviolet light 2081 then passes through the barrier mask 207 comprising a through region 207a and a barrier region 207b. The through region 207a corresponds to the second region 2042 of the first polarizing film 204, and the barrier region 207b corresponds to the first region 2041 of the first polarizing film 204.

Thus, the polarized ultraviolet light 2081 passing through the barrier mask 207 only irradiates the second region 2042 of the first polarizing film. The second region 2042 of the first organic film thus is optically aligned, forming a polarization axis parallel to the polarization direction of the polarized ultraviolet light 2081. Due to the barrier region 207b of the barrier mask 207, the first region 2041 of the first polarizing film 204 corresponding to the color filter region 2021 of the color filter film 202 is not irradiated by the polarized ultraviolet light. Therefore, the first region 2041 of the first polarizing film 204 does not have a polarization axis, and so light may pass through the first region 2041 of the first polarizing film 204. FIG. 9B illustrates the state when this step is completed.

Specifically, the organic film can be pre-baked. The pre-baking temperature may be in the range of 10° C.-30° C. The pre-baked organic film is irradiated by polarized ultraviolet light, causing the dichroic organic dye in the polyimide to be aligned along a direction based on the polarization direction of the polarized ultraviolet light. During the irradiation by polarized ultraviolet light, the energy of the polarized ultraviolet light may be in the range of 800 mj-1000 mj. After the irradiation of polarized ultraviolet light, a baking process is performed to the organic film, followed by a curing process. The baking temperature is in the range of 90° C.-130° C., and the baking time is in the range of 90 seconds-120 seconds. The curing temperature is in the range of 210° C.-230° C., and the curing time is in the range of 20 minutes-50 minutes.

Figure 9C:
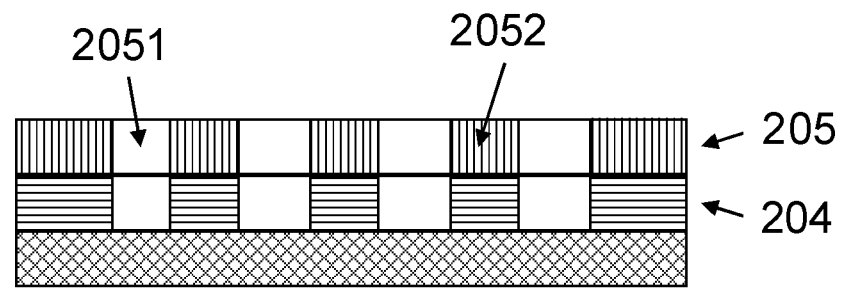

Step S1208: forming a second polarizing film 205 on the first polarizing film 204. FIG. 9C illustrates a corresponding structure. As shown in FIG. 9C, the second polarizing film 205 is formed on the first polarizing film 204. Specifically, the surface of the first polarizing film 204 may be coated with a second organic film containing polyimide doped with dichroic dye on.

Figure 8B:
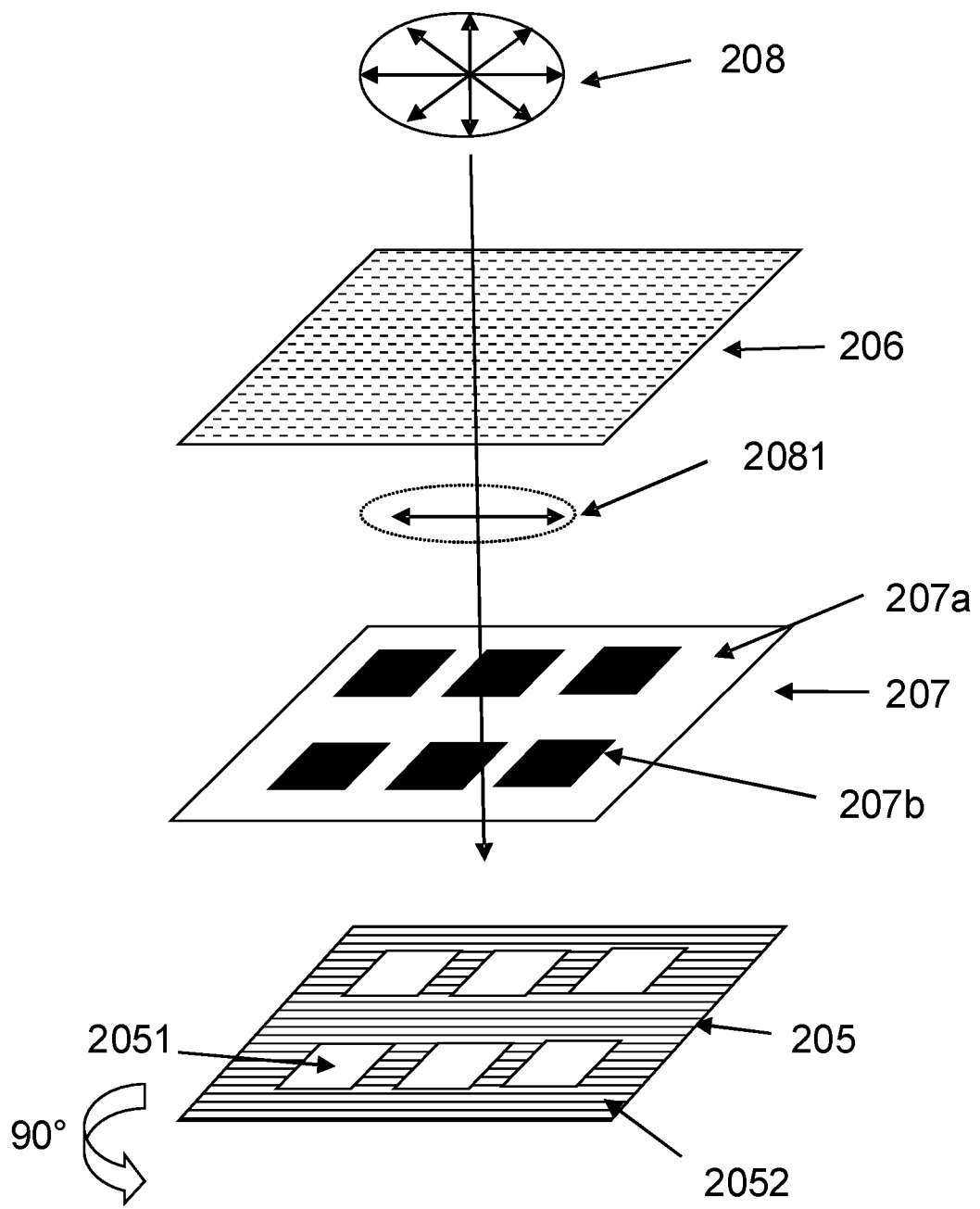

Step S1210: rotating the display panel obtained in Step S1208 for 90 degrees clockwise or counterclockwise, and irradiating the display panel again with a polarized ultraviolet light. This step is illustrated in FIG. 8B and FIG. 9C. As shown in FIG. 8B, the second polarizing film 205 is rotated by 90 degrees counterclockwise.

After the ultraviolet light 208 passes through the metal grating 206, the ultraviolet light becomes a polarized ultraviolet light 2081. The polarized ultraviolet light 2081 then passes through the barrier mask 207 comprising a through region 207a and a barrier region 207b. The through region 207a corresponds to the second region 2052 of the second polarizing film 205, and the barrier region 207b corresponds to the first region 2051 of the second polarizing film 205. Thus, the polarized ultraviolet light 2081 passing through the through region 207a of the barrier mask 207 only irradiates the second region 2052 of the second polarizing film 205.

Thus, the second region 2052 of the second polarizing film 205 is optically aligned, forming a polarization axis parallel to the polarization direction of the polarized ultraviolet light 2081. Due to the barrier region 207b of the barrier mask 207, the first region 2051 of the second polarizing film 205 corresponding to the color filter region 2021 of the color filter film 202 is not irradiated by the polarized ultraviolet light. Therefore the first region 2051 of the second polarizing film 205 does not have a polarization axis, and so light can pass through the first region 2051 of the second polarizing film 205.

Because the second polarizing film 205 is rotated by 90 degrees, the polarizing axis of the second region 2042 of the first polarizing film 204 and the polarizing axis of the second region 2052 of the second polarizing film 205 are perpendicular to each other. Further, the projections of the first region 2041 of the first polarizing film 204, the first region 2051 of the second polarizing film 205, and the barrier region 207b of the barrier mask 207 on the color filter film 202 overlap. FIG. 9C illustrates the state when this step is completed.

Accordingly, the display panel prepared by the procedure illustrated in FIG. 12 may be used to replace the existing black matrix that is deposited on the light blocking region of a color filter film.

Figure 13:
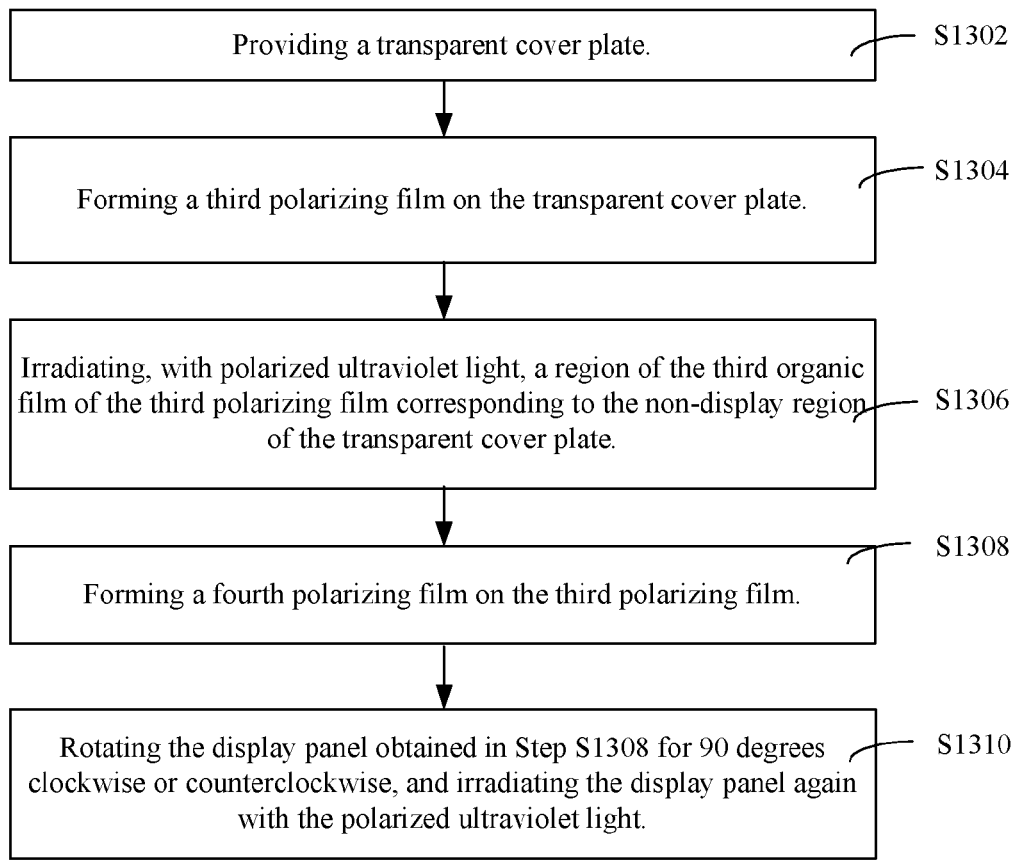
FIG. 13 illustrates another exemplary process flow chart consistent with the disclosed embodiments.

FIG. 13 illustrates an exemplary process for manufacturing an LCD transparent cover plate of a display panel. The method for manufacturing an LCD transparent cover plate comprises following steps.

Figure 11A:
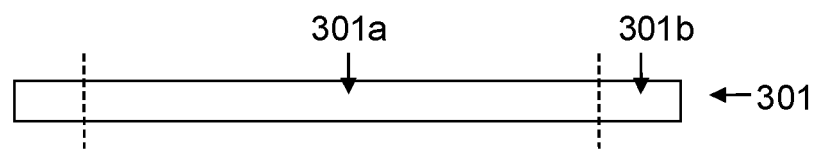
FIG. 11A, FIG. 11B and FIG. 11C illustrate another set of exemplary forming processes consistent with the disclosed embodiments.

Step S1302: providing a transparent cover plate 301. FIG. 11A illustrates a corresponding structure. As shown in FIG. 11A, the transparent cover plate 301 comprises a display region 301a and a non-display region 301b. The display region 301a corresponds to the pixel region of the display panel (not shown).

Figure 11B:
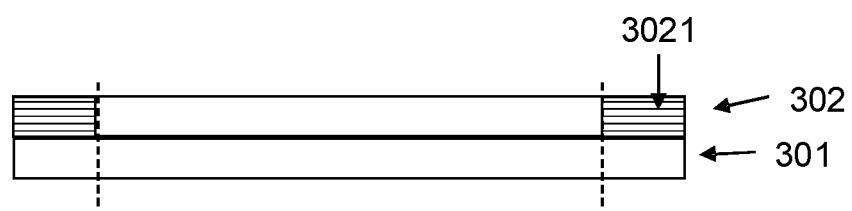

Step S1304: forming a third polarizing film 302 on the transparent cover plate 301. FIG. 11B illustrates a corresponding structure. As shown in FIG. 11B, the third polarizing film 302 comprises a third organic film, and the material of the third organic film may be polyimide doped with a dichroic dye. More specifically, the transparent cover plate 301 may be coated with a layer of polyimide prepolymer doped with a dichroic organic dye.

Step S1306: irradiating, with polarized ultraviolet light, a region of the third organic film of the third polarizing film 302 corresponding to the non-display region 301b of the transparent cover plate 301, forming a third region 3021 having a polarization axis.

Figure 10A:
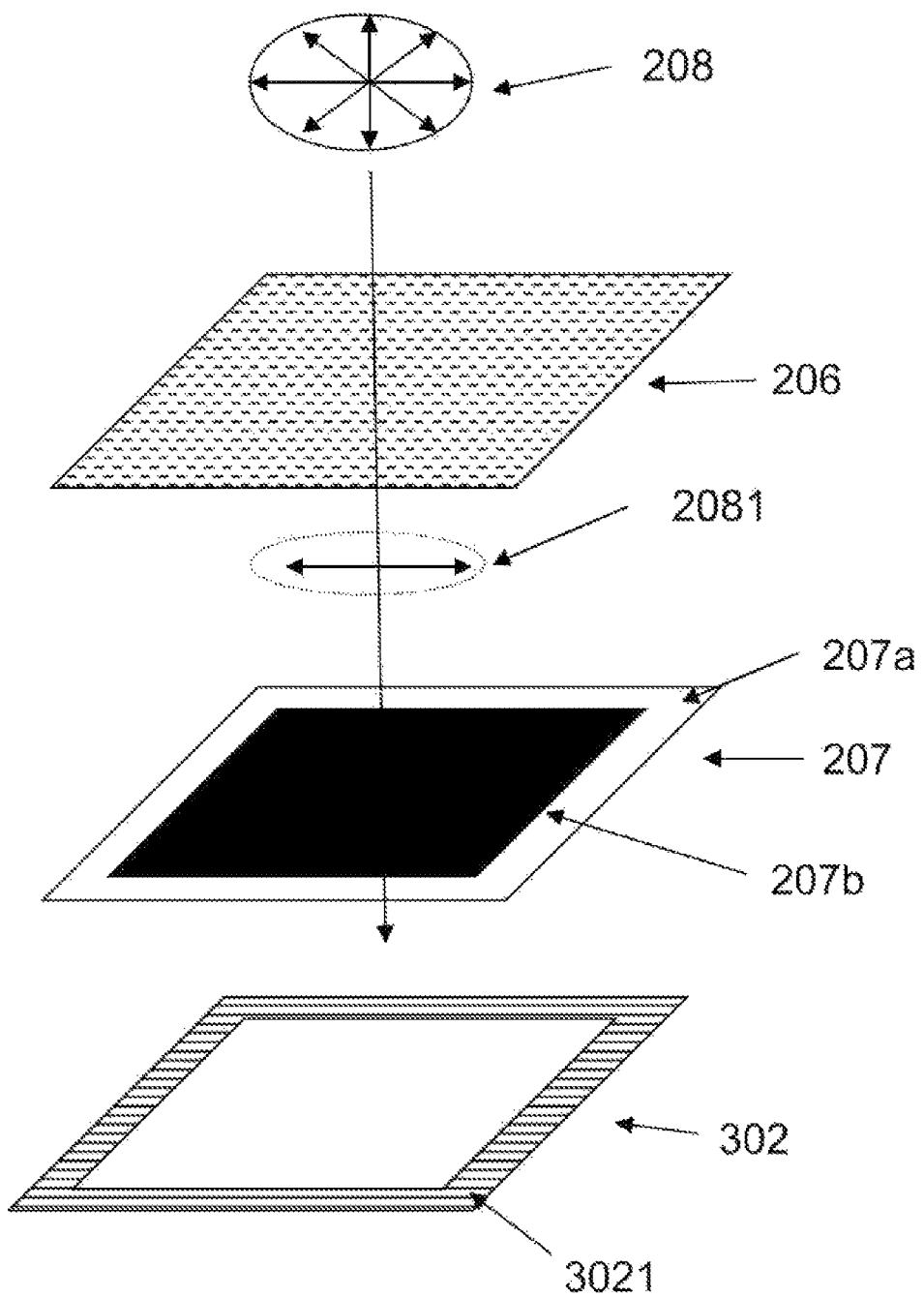
FIG. 10A and FIG. 10B illustrate another set of exemplary manufacturing steps consistent with the disclosed embodiments.

FIG. 10A illustrates the operation procedure of this step. There is a mask barrier 207 above the third polarizing film 302. The mask barrier 207 comprises a through region 207a and a barrier region 207b. There is a metal grating 206 above the mask barrier 207. In the irradiation procedure, ultraviolet light goes in the direction from the metal grating toward the third polarizing film 302.

As shown in FIG. 10A, after the ultraviolet light 208 passes through the metal grating 206, the ultraviolet light becomes a polarized ultraviolet light 2081. The polarized ultraviolet light 2081 then passes through the barrier mask 207 comprising a through region 207a and a barrier region 207b. The through region 207a corresponds to the third region 3021 of the third polarizing film 302, and the barrier region 207b corresponds to the non-third region of the third polarizing film 302.

Thus, the polarized ultraviolet light 2081 passing through the barrier mask 207 only irradiates the third region 3021 of the third polarizing film 302. The third region 3021 of the third polarizing film 302 thus is optically aligned, forming a polarization axis parallel to the polarization direction of the polarized ultraviolet light 2081. Due to the barrier region 207b of the barrier mask 207, the non-third region of the third polarizing film 302 corresponding to the display region of the cover plate is not irradiated by the polarized ultraviolet light. Therefore, the non-third region of the third polarizing film 302 does not have a polarization axis, and so light can pass through the non-third region of the third polarizing film 302. FIG. 11B illustrates the state after this step is completed.

Figure 11C:
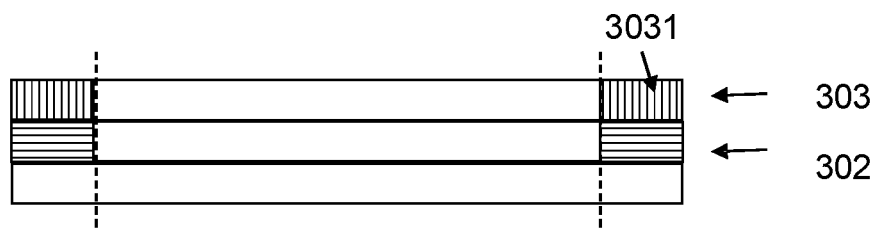

Step S1308: forming a fourth polarizing film 303 on the third polarizing film 302. FIG. 11C illustrates a corresponding structure. As shown in FIG. 11C, the fourth polarizing film 303 is formed on the third polarizing film 302. Specifically, the surface of the third polarizing film 302 may be coated with a fourth polarizing film 303 containing polyimide doped with a dichroic dye.

Figure 10B:
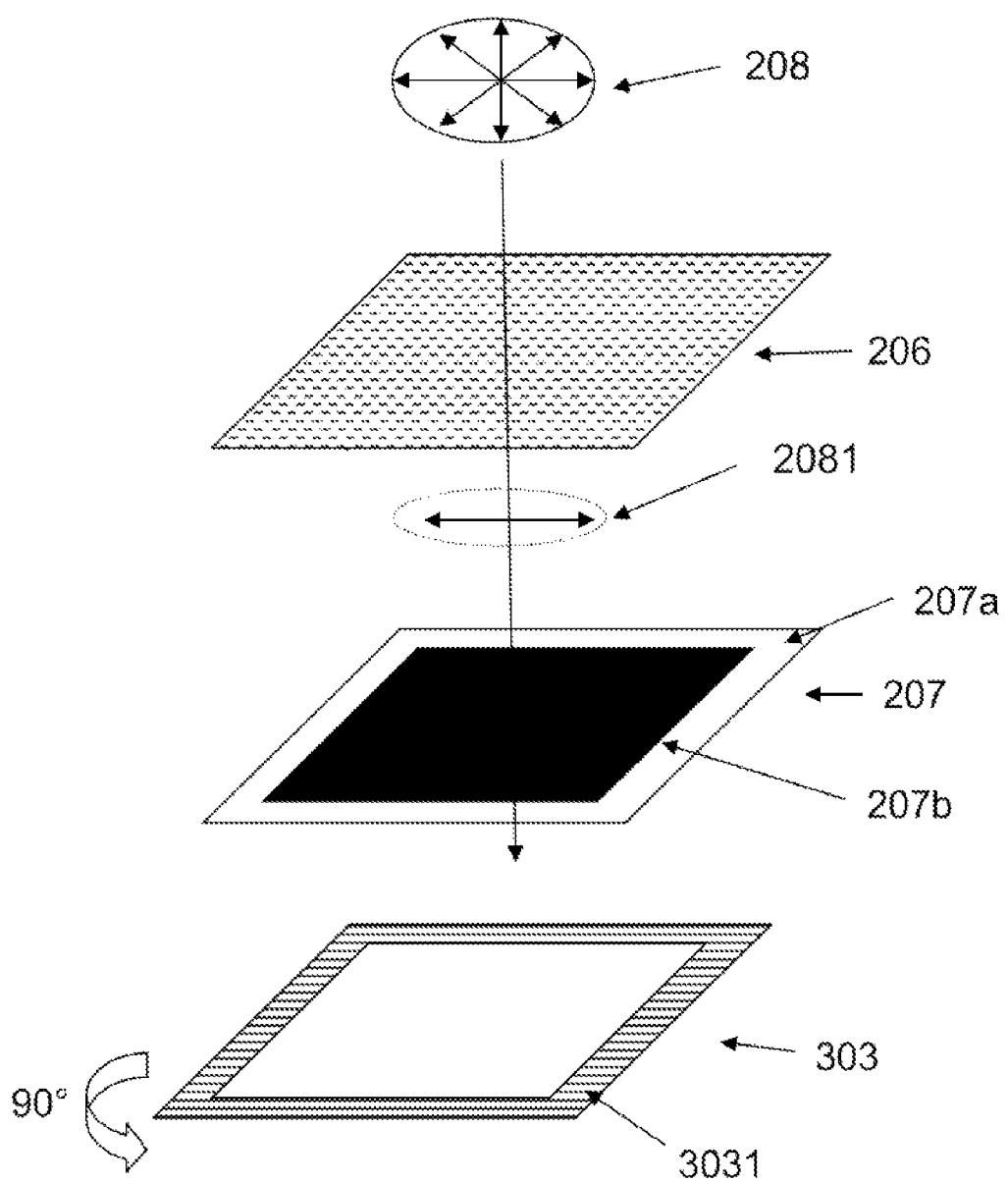

Step S1310: rotating the display panel obtained in Step S1308 for 90 degrees clockwise or counterclockwise, and irradiating the display panel again with the polarized ultraviolet light. This step is illustrated in FIG. 10B and FIG. 11C. As shown in FIG. 10B, the fourth polarizing film 303 is rotated by 90 degrees counterclockwise.

After the ultraviolet light 208 passes through the metal grating 206, the ultraviolet light becomes a polarized ultraviolet light 2081. The polarized ultraviolet light 2081 then passes through the barrier mask 207 comprising a through region 207a and a barrier region 207b. The through region 207a corresponds to the third region 3031 of the fourth polarizing film 303, and the barrier region 207b corresponds to the non-third region of the fourth polarizing film 303. Thus, the polarized ultraviolet light 2081 passing through the barrier mask 207 only irradiates the third region 3031 of the fourth polarizing film 303.

Thus, the third region 3031 of the fourth polarizing film 303 is optically aligned, forming a polarization axis parallel to the polarization direction of the polarized ultraviolet light 2081. Due to the barrier region 207b of the barrier mask 207, the non-third region of the fourth polarizing film corresponding to the display region 301a of the transparent cover plate 301 is not irradiated by the polarized ultraviolet light. Therefore the non-third region of the fourth polarizing film does not have a polarization axis, and so light can pass through the non-third region of the fourth polarizing film 303.

Because the fourth polarizing film is rotated for 90 degrees, the polarization axis of the third region 3021 of the third polarizing film 302 and the polarization axis of the third region 3031 of the fourth polarizing film 303 are perpendicular to each other. FIG. 11C illustrates the state when this step is completed.

Accordingly, with the LCD transparent cover plate obtained by the procedure illustrated in FIG. 13, there is no need to form a non-display area using a black matrix, thus avoiding the problem of the leakage of reflection light.

The disclosed display panels may be used in various types of display devices, including mobile phones and large scale display devices. A display device may also comprise one or more liquid crystal display modules and other components. The configuration of a liquid crystal display module is described above, and is not elaborated here.

The disclosed display panel structures may be used to improve the performance of a touch screen. In such an improvement, two polarizing films with partial regions whose polarization axes are perpendicular to each other are used, instead of a black matrix, to form a light blocking region. The present invention can also be applied to other panel structures used in display technologies.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A display panel, comprising:
   a display module comprising:
   a color filter film comprising a color filter region and a light blocking region, the color filter film having one side and an opposing side,
   a first polarizing film, placed at the one side of the color filter film, comprising a first region corresponding to the color filter region of the color filter film and a second region corresponding to the light blocking region of the color filter film,
   a second polarizing film, placed at the one side of the color filter film, comprising a first region corresponding to the color filter region of the color filter film and a second region corresponding to the light blocking region of the color filter film, wherein a polarization axis of the second region of the second polarizing film and a polarization axis of the second region of the first polarizing film are perpendicular to each other; and
   a transparent cover plate placed at the opposing side of the color filter film, wherein light propagates along a direction from the display module towards the transparent cover plate; and
   a third polarizing film and a fourth polarizing film formed between the transparent cover plate and the color filter film.

2. The display panel according to claim 1, further comprising
   a first substrate and a second substrate that are oppositely placed, wherein the first polarizing film is formed on the first substrate, and the second polarizing film is formed on the second substrate.

3. The display panel according to claim 1, wherein the first region of the first polarizing film and the first region of the second polarizing film do not have a polarization axis.

4. The display panel according to claim 1, wherein:
   the first polarizing film comprises a first organic film;
   the second polarizing film comprises a second organic film; and
   the first organic film and the second organic film are optically aligned under irradiation of polarized ultraviolet light.

5. The display panel according to claim 4, wherein the first organic film and the second organic film are made of polyimide doped with an organic dichroic dye.

6. The display panel according to claim 5, wherein the organic dichroic dye is an azo dye, an anthraquinone dye, a biphenyl dye, a type of triphenylmethane diazinon and derivative dye, a type of single-methine multi-methine dye, or a poly-methine ring dye.

7. The display panel according to claim 1, wherein the color filter region of the color filter film is filled with red, blue or green color barriers, and both the first region of the first polarizing film and the first region of the second polarizing film correspond to pixel regions of the display panel.

8. The display panel according to claim 1, wherein:
   the transparent cover plate comprises a display region and non-display region;
   the third polarizing film comprises a third region having a polarization axis at a place corresponding to the non-display region of the transparent cover plate;
   the fourth polarizing film comprises a third region having a polarization axis at a place corresponding to the non-display region of the transparent cover plate; and
   the polarization axis of the third region of the third polarizing film and the polarization axis of the third region of the fourth polarizing film are perpendicular to each other.

9. The display panel according to claim 8, wherein:
   the third polarizing film comprises a third organic film;
   the fourth polarizing film comprises a fourth organic film; and
   the third organic film and the fourth organic film are optically aligned under irradiation of polarized ultraviolet light.

10. The display panel according to claim 9, wherein the third organic film and the fourth organic film are made of polyimide (PI) doped with an organic dichroic dye.

11. A method for manufacturing a display panel, comprising:
    providing a color filter film comprising a color filter region and a light-blocking region, the color filter film having one side and an opposing side;
    forming a first polarizing film on the one side of the color filter film and having a first region corresponding to the color filter region, wherein the first polarizing film comprises a first organic film;
    irradiating, with a polarized ultraviolet light, a region of the first organic film of the first polarizing film corresponding to the light blocking region of the color filter film to form a second region with a polarizing axis;
    forming a second polarizing film on the first polarizing film and having a first region corresponding to the color filter region, wherein the second polarizing film comprises a second organic film;
    rotating the incomplete display panel by 90 degrees clockwise or counterclockwise; and
    irradiating, with the polarized ultraviolet light, a region of the second organic film of the second polarizing film corresponding to the light blocking region of the color filter film to form a second region with a polarizing axis,
    wherein before irradiating the first organic film and the second organic film with the polarized ultraviolet light, the first organic film and the second organic film are pre-baked; and
    after irradiating the first organic film and the second organic film with the polarized ultraviolet light, a baking process is performed to the first organic film and the second organic film, followed by a curing process.

12. The method according to claim 11, wherein the polarized ultraviolet light irradiating the first organic film and the second organic film is obtained by passing an ultraviolet light through a polarizer and a barrier mask.

13. The method according to claim 12, wherein the polarizer is a metal grating.

14. The method according to claim 11, wherein forming the first organic film and the second organic film comprises coating a layer of polyimide prepolymer doped with a dichroic dye.

15. The method according to claim 14, wherein the dichroic dye is an azo dye, an anthraquinone dye, a biphenyl dye, a type of triphenylmethane diazinon and derivative dye, a type of single-methine multi-methine dye, or a polymethine ring dye.

16. The method according to claim 11, wherein:
pre-baking temperature is in a range of 10° C.-30° C.;
energy of the polarized ultraviolet light is in a range of 800 mj-1000 mj;
baking temperature is in a range of 90° C.-130° C.;
baking time is in a range of 90 seconds-120 seconds;
curing temperature is in a range of 210° C.-230° C.; and
curing time is in a range of 20 minutes-50 minutes.

17. The method according to claim 11, further comprising forming a transparent cover plate at the opposing side of the color filter film by:
providing a transparent cover plate including a display region and a non-display region;
forming a third polarizing film on the transparent cover plate, wherein the third polarizing film comprises a third organic film;
irradiating, with a polarized ultraviolet light, a region of the third organic film of the third polarizing film corresponding to the non-display region of the transparent cover plate, forming a third region having a polarization axis;
forming a fourth polarizing film on the third polarizing film, wherein the fourth polarizing film comprises a fourth organic film;
rotating the display panel for 90 degrees clockwise or counterclockwise; and
irradiating, with the polarized ultraviolet light, a region of the fourth organic film of the fourth polarizing film corresponding to the non-display region of the transparent cover plate, forming a third region having a polarization axis.

18. The method according to claim 17, wherein the third organic film and the fourth organic film are made of a polymer doped with a dichroic dye.

19. The method according to claim 18, wherein the polymer is polyimide.

* * * * *